(12) United States Patent
Danelski

(10) Patent No.: US 6,762,382 B1
(45) Date of Patent: Jul. 13, 2004

(54) TRACK-TYPE SORTATION SYSTEM

(75) Inventor: Darin L. Danelski, Palmyra, WI (US)

(73) Assignee: Innovative Picking Technologies, Inc., Dousman, WI (US)

( * ) Notice: Subject to any disclaimer, the term of this patent is extended or adjusted under 35 U.S.C. 154(b) by 0 days.

(21) Appl. No.: 09/969,402

(22) Filed: Oct. 2, 2001

(51) Int. Cl.[7] .................................................. G06K 9/28
(52) U.S. Cl. ..................... 209/583; 209/912; 700/215; 700/214; 700/226; 198/370.04; 198/370.05
(58) Field of Search ................................ 209/583, 912, 209/565, 564, 563, 559; 198/370.01, 350, 349, 370.04, 370.05, 349.2, 349.1, 349.5, 349.6; 700/15, 215, 214, 218, 226, 227

(56) References Cited

U.S. PATENT DOCUMENTS

| | | | |
|---|---|---|---|
| 4,854,439 A | * 8/1989 | Ueda .......................... | 198/350 |
| 5,676,514 A | * 10/1997 | Higman et al. ............. | 414/339 |
| 5,842,555 A | * 12/1998 | Gannon et al. ............. | 198/358 |
| 5,990,437 A | * 11/1999 | Coutant et al. ............. | 209/583 |
| 6,246,023 B1 | * 6/2001 | Kugle ........................ | 209/584 |

* cited by examiner

Primary Examiner—Donald P. Walsh
Assistant Examiner—Jonathan R Miller
(74) Attorney, Agent, or Firm—Boyle Fredrickson Newholm Stein & Gratz S.C.

(57) ABSTRACT

A sortation system includes a track arrangement and a series of carriers which are movable on the track arrangement, such as by a roller chain or the like. A series of sort stations are provided at various locations along the track arrangement, and items are placed into the carriers at an induction station. Each carrier is programmed at the induction station with a destination sort station, according to the identity of the item carried by the carrier. Each sort station has a unique identification arrangement, such as a sort station module which emits a sort station identification signal which is received by the carriers as the carriers are moved toward the sort stations. If the sort station identification signal matches the destination identification programmed into the carrier, a trip mechanism associated with the sort station is activated so as to discharge the item from the carrier. The carrier is then reset and transported to the induction station for receiving another item to be sorted. If the sort station identification signal does not match the destination identification of the carrier, the carrier advances to the next sort station until the destination sort station is reached.

23 Claims, 6 Drawing Sheets

TRACK-TYPE SORTATION SYSTEM

BACKGROUND AND SUMMARY OF THE INVENTION

This invention relates to sortation systems, and more particularly to a sortation system which utilizes a series of carriers movable on a track, wherein the track includes a series of sortation stations and the carriers deposit items at the sortation stations, for sorting the items into individual orders or the like.

Various types of sortation systems are known, and are typically used in connection with order fulfillment, returns processing, mail sortation, or any other application in which different items are to be sorted according to certain parameters. One such system utilizes carriers, in the form of trays, mounted to a track. The trays are connected together in train-type fashion, and are moved along the track in any satisfactory manner, such as by use of a chain drive mechanism or the like. Individual receptacles are placed at sort stations at discrete locations along the length of the track. When the tray arrives at a sort station which requires the item carried by the tray, a discharge arrangement functions to discharge the item from the tray and into the receptacle, such as by means of a chute located at the sort station. The tray may include a false bottom, which is opened when the tray reaches the desired sort station such that the item or items carried by the tray fall into the chute and are deposited into the receptacle. The tray then advances on the track to close the false bottom of the tray, and a subsequent item is placed into the tray for sortation into another order or the like.

Systems of this type typically operate continuously, and at a relatively high rate of speed. Typically, items are placed within the trays at an induction station, wherein the item is identified and is advanced to its desired sort station by the drive mechanism. In this type of system, photoelectric sensors are provided along the length of the track in the vicinity of each sort station, and provide inputs which count the trays as the trays are advanced along the track. A pneumatic actuator is typically provided at each sort station, for tripping a discharge mechanism associated with each tray so as to allow the contents of the tray to drop from the false bottom of the tray. While this type of system functions satisfactorily to sort items, such systems are expensive and time consuming to construct and install. The photoelectric sensors require power supply wiring as well as interconnection with a controller that receives the inputs from the photoelectric sensors. The pneumatic actuators require both power supply wiring as well as a source of pressurized air, at each sort station. A common system has several hundred sort stations, and thus requires a significant amount of time, material and expense to construct and install. Further, systems of this type require the trays to be connected together so as to enable the trays to be reliably counted and to thereby provide accuracy in depositing the correct items in the correct order receptacles. If the system is operated so that all trays carry an item to be sorted, system throughput is unacceptably slow and causes a bottleneck in the overall process. Accordingly, systems of this type are operated at a relatively high rate of speed to increase overall throughput. However, it is common for many trays to be empty when being transported along the track, due to the inability of the induction mechanism or operator to keep up with the speed of operation and place one or more items in each tray. While the speed of operation of the trays maintains throughput at an acceptable level, this type of system is inefficient in that many trays are transported empty through the system.

It is an object of the present invention to provide a sortation system which is generally similar to the type of system described above, providing carriers movable on a track with sort stations at various discrete locations along the track. It is a further object of the invention to provide such a system which eliminates the need for photoelectric sensors and pneumatic actuators, and thereby the required communication wiring as well as pressurized air supply to each sortation station. It is a further object of the invention to provide such a sortation system which can be operated at a slower speed, yet which provides the same or greater throughput than prior art systems by reducing the number of carriers which are empty during operation. A still further object of the invention is to provide such a sortation system which is capable of asynchronous operation, in that the carriers are movable on the track independently of each other. A still further object of the invention is to provide such a sortation system which is highly accurate and reliable, ensuring that the correct items are placed into the correct orders. Yet another object of the invention is to provide such a system which is easy to operate, and which can be used in connection with any type of induction system.

In accordance with the present invention, a sortation system includes a track arrangement having a series of sort stations, and a series of carriers movable on the track arrangement. The carriers are adapted to receive items destined to be deposited at the sort stations. Each carrier includes an actuable item discharge arrangement, for discharging the item or items from the carrier.

Each sort station includes an actuator and a unique identification arrangement. Each carrier is provided with a destination identification according to the identity of the item contained within the carrier. Each sort station actuator and identification arrangement interacts with the carriers, to determine whether the sort station is the destination sort station for the carrier. If so, the sort station actuator is selectively operated to actuate the item discharge arrangement of the carrier, such that items carried by the carrier are discharged from the carrier at the predetermined sort station, according to the identity of the items carried by the carrier. The carriers are movable on the track arrangement independently of each other. The identification features associated with the carriers and the sort stations are in the form of a wireless transceiver system which operate the sort station actuators to actuate the actuable item discharge arrangement of each carrier when the carrier reaches its destination sort station. The transceiver system includes a sort station signal emitter at each sort station, which emits a unique sort station identification signal corresponding to the location of the sort station, which may represent an order being filled by items transported on the carriers along the track arrangement. The transceiver system further includes a receiver interconnected with a programmable memory as associated with each carrier. The programmable memory is programmed with a destination identification according to the item(s) carried by the carrier, and the receiver receives the unique sort station identification signals as the carriers are moved past the sort stations. A simple program associated with each carrier processes the received sort station identification signals for comparison against the destination identification, to ascertain whether the sort station is the destination sort station for the carrier. If not, the carrier continues its movement along the track arrangement to the next sort station, where the operation continues until the carrier reaches its destination sort station. When the destination sort station is reached, the program associated with the carrier functions to transmit an actuation signal to the transceiver associated with the destination sort station, which is processed by the actuator so as to operate the actuator to actuate the item discharge arrangement of the carrier and to discharge the one or more items from the carrier at the destination sort station, and into an order receptacle located at the destination sort station. The carrier then continues its movement along the track arrangement to an induction station. A passive reset arrangement is located along the track arrangement upstream of the induction station, for closing the false bottom of the carrier in preparation for receiving another one or more items to be sorted at the induction station.

Each carrier is provided with its own source of power, such as a battery power supply, which provides power to the transceiver associated with the carrier. The actuator associated with each sort station includes a trip mechanism, which is movable between an operative position into the path of the carrier, and an inoperative position withdrawn from the path of the carrier. In the operative position, the trip mechanism engages the actuable item discharge arrangement of the carrier, for discharging items carried by the carrier at the destination sort station.

The invention also contemplates a method of sorting items as well as an improvement in an item sortation system, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
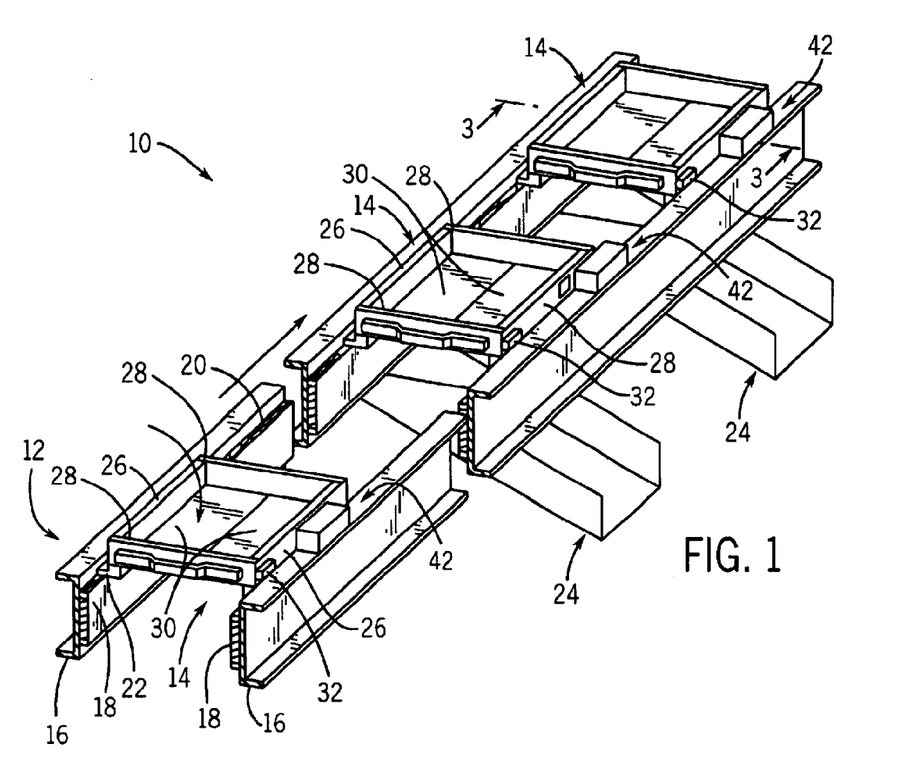
FIG. 1 is a partial isometric view illustrating a portion of a track-type sortation system according to the present invention.
Figure 2:
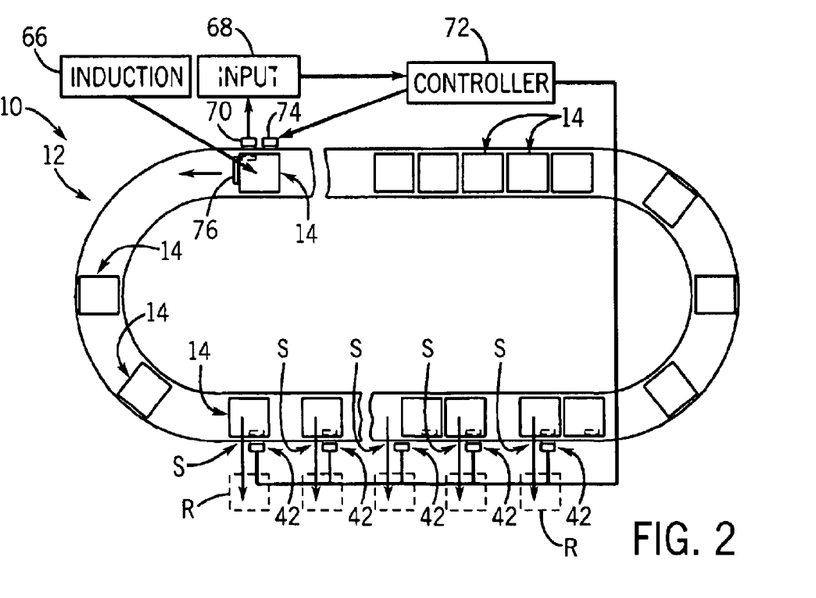
FIG. 2 is a schematic representation of an overall track-type sortation system within which the portion illustrated in FIG. 1 is incorporated.
Figure 3:
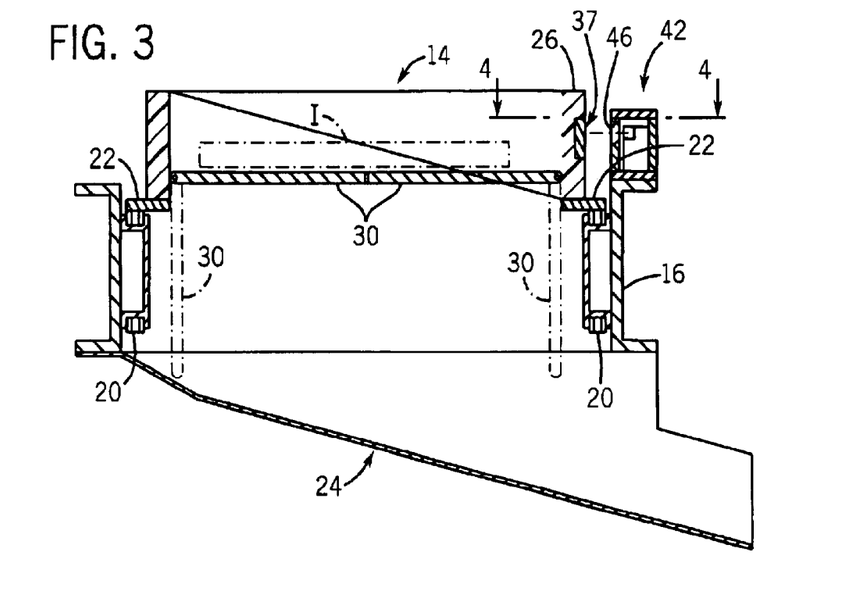
FIG. 3 is a partial section view taken along line 3—3 of FIG. 1.

Referring to FIGS. 1–3, a sortation system 10 generally includes a track arrangement 12 and a series of carriers 14 which are movable on track arrangement 12. Track arrangement 12 includes a pair of beams 16 which support rails 18, and which in turn support carriers 14. A drive mechanism, such as a pair of roller chains 20, is provided on track arrangement 12 for transporting carriers 14 along rails 18. Roller chains 20 operate in a continuous manner, and carriers 14 rest on roller chains 20 and rely upon frictional engagement with roller chains 20 in order to transport carriers 14 on rails 18. Carriers 14 can be freely removed from and placed on rails 18 simply by lifting carriers 14 off of rails 18 and placing carriers 14 on rails 18.

Each carrier 14 includes a pair of laterally extending support wings 22, each of which rests on one of roller chains 20, for providing movement of carriers 14 along rails 18 when carriers 14 are placed on rails 18.

A series of sort stations S are located at predetermined discrete locations along the length of track arrangement 12. As shown in FIG. 2, a receptacle R is located at each sort station S, for receiving items sorted by sortation system 10 into individual orders, return containers, mail containers, or the like. As shown in FIG. 1, a discharge chute 24 may be provided at each sort station S, for discharging items from carriers 14 into receptacles R.

Each carrier 14 is generally in the form of a tray, including spaced apart side walls 26 and end walls 28. Each carrier 14 further includes a pair of bottom panels 30, each of which is pivotably mounted to the bottom end of one of side walls 26. Bottom panels 30 are pivotable between a closed position as shown in FIG. 1, for supporting an item within the interior defined by carrier 14, and an open position for releasing support of the item and allowing the item to fall downwardly out of the interior of carrier 14. Each carrier 14 includes a conventional latch mechanism for maintaining bottom panels 30 in the closed position, and an actuator 32 mounted to one of side walls 26. Actuator 32 is interconnected with the latch mechanism which maintains bottom panels 30 in the closed position, for selectively maintaining bottom panels 30 in the closed position and for selectively releasing engagement with bottom panels 30 to allow bottom panels 30 to fall by gravity to the open position. Actuator 32 and the latch mechanism interconnected with bottom panels 30 are of conventional construction. In a known manner, actuator 32 includes a slot within which a spring biased trigger member is located, for selectively releasing the latch mechanism in response to movement of an actuator member through the slot.

Figure 4:
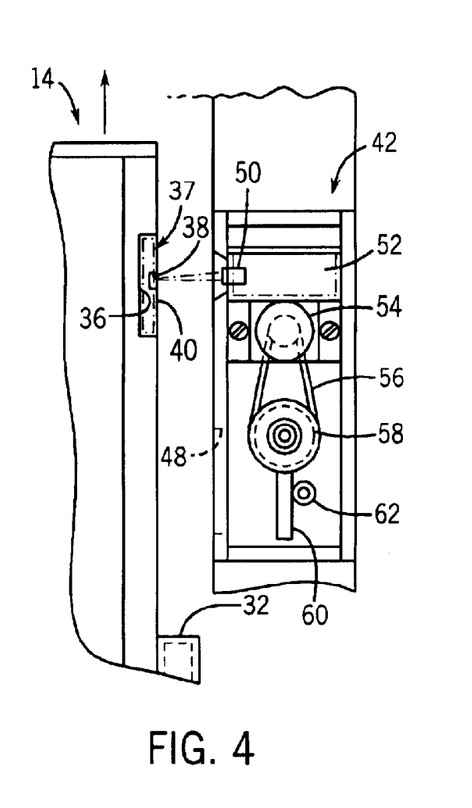
FIG. 4 is a partial section view taken along line 4—4 of FIG. 3, showing a sort station actuator mechanism in an inoperative position.
Figure 5:
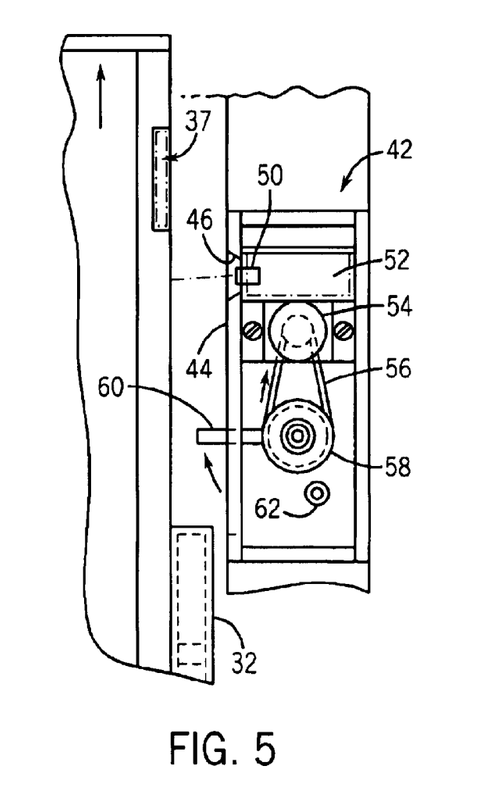
FIG. 5 is a view similar to FIG. 4, showing movement of the sort station actuator to an operative position for discharging the contents of a carrier at a sort station.

FIGS. 3–5 illustrate the construction of carriers 14 and actuators 32 in greater detail, including engagement of wings 22 with roller chains 20 as well as movement of bottom panels 30 between a closed position for supporting an item I, and an open position as shown in phantom for releasing support of item I such that item I drops into chute 24 for placement into a receptacle R.

Carrier 14 is constructed such that one of its side walls 26 is formed with a recess within which a carrier module 37 is located. Carrier module 37 includes an infrared transceiver 38 secured to a circuit board mounted within recess 36, together with a power supply such as a set of conventional low profile batteries. A transparent window 40 is mounted over recess 36, for enclosing carrier module transceiver 38 and its associated circuit board and power supply. Window 40 can be removed in order to allow replacement of the batteries of carrier module 37.

A sort station module 42 is mounted to track arrangement 12 at each sort station S. Each sort station module 42 includes a housing mounted to one of beams 16, including a side wall 44 having an aperture 46 formed therein. Side wall 44 further includes a slot 48 spaced from aperture 46.

Within the housing interior, sort station module 42 includes an infrared transceiver 50 mounted to a circuit board 52, in combination with a motor 54 having an output member coupled to a belt 56, which in turn is engaged with a wheel 58 to which an actuating arm 60 is mounted. Wheel 58 is rotatable in response to movement of belt 56 through operation of motor 54, for moving actuating arm 60 between an inoperative position as shown in FIG. 4, wherein actuating arm 60 is maintained within the housing interior, and an operative position as shown in FIG. 5 in which actuating arm 60 is pivoted outwardly through slot 48 so as to extend inwardly from the inner edge of housing side wall 44. Actuating arm 60 engages the end of slot 48 to maintain actuating arm 60 in its operative position, and engages a stop member 62 to maintain actuating arm 60 in its inoperative position.

FIG. 2 schematically illustrates the components of sortation system 10, including track arrangement 12 and carriers 14 which are movable on track arrangement 12. As shown in FIG. 2, sortation system 10 includes an induction station 66 where items are loaded into carriers 14 for delivery to the sortation stations S. An item identification input 68 is located at or downstream of induction station 66, for providing input information pertaining to the identity of the item placed into each carrier 14. Input 68 may receive item information from an interface 70 which may be in the form of a bar code reader or operator keyboard, and is interconnected with a central host computer or controller 72 which is programmed in a conventional manner to identify the order or the like within which each items is to be placed. A carrier communication module 74 is connected to controller 72, and includes a transceiver for communicating with carrier transceiver 38.

Figure 6:
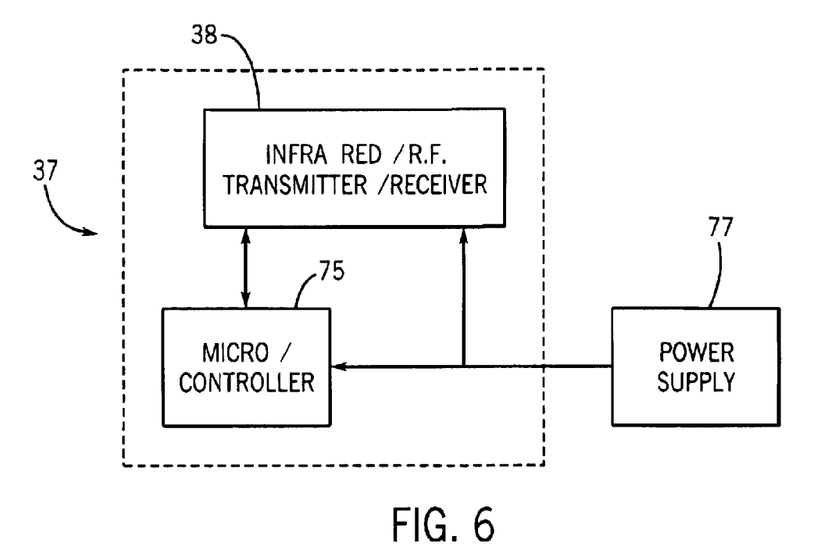
FIG. 6 is a schematic representation of the components of a carrier module incorporated in the sortation system of FIG. 1.

FIG. 6 schematically illustrates the components of carrier module 37, including transceiver 38 which is interconnected with a microcontroller 75 incorporated in the circuit board of carrier module 37. A power supply 77, which may be a set of conventional batteries, is connected to transceiver 38 and to microcontroller 75.

Figure 7:
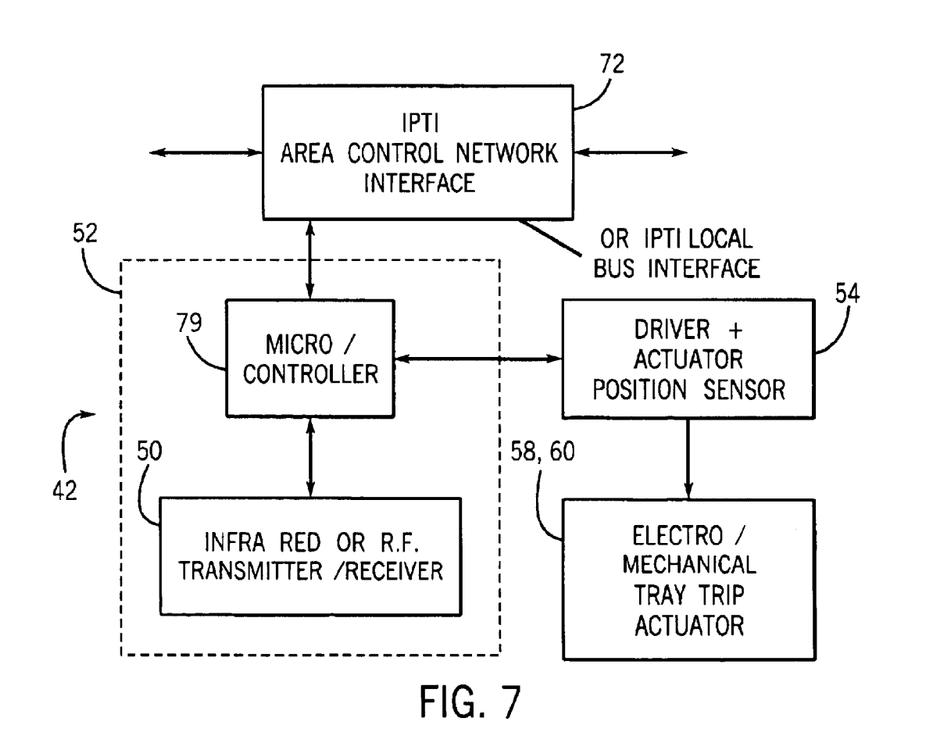
FIG. 7 is a schematic representation of the components of a station module incorporated in the sortation system of FIG. 1.

FIG. 7 schematically illustrates the components of sort station modules 42, including transceiver 50 and a microcontroller 79 mounted to circuit board 52. Microcontroller 79 is connected to motor 54, which in turn is connected to wheel 58 and actuating arm 60. Microcontroller 79 is also interconnected with the central controller 72, for controlling the output of sortation system 10 at each sort station S.

In operation, sortation system 10 functions as follows in order to sort items carried by carriers 14 at the various sortation stations S.

Figure 8:
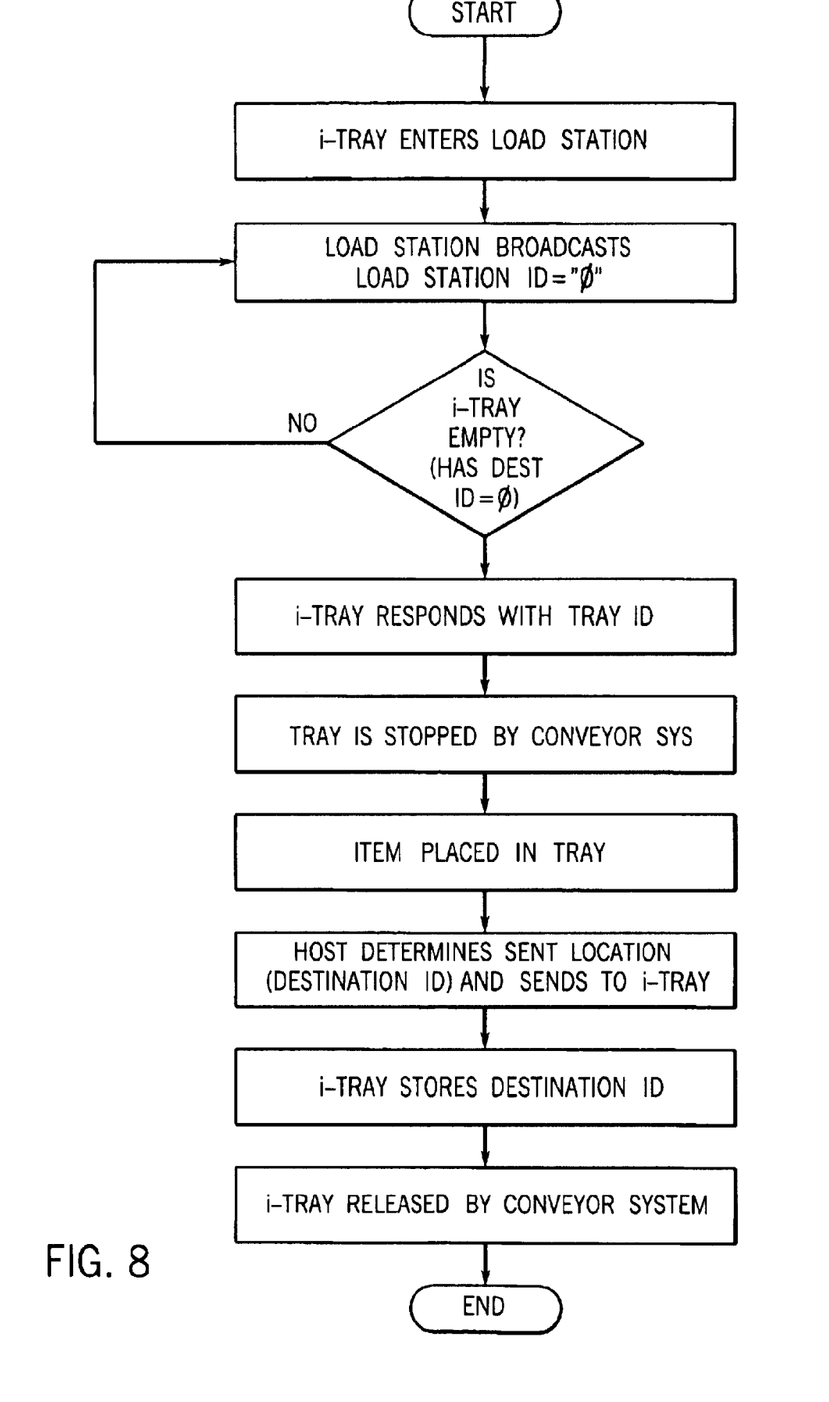
FIGS. 8–10 are flow charts illustrating operation of the components incorporated in the sortation system of FIGS. 1–5.

Referring to FIG. 8, each carrier 14, which is referred to as an "i-tray", enters induction station 66 where carrier communication module 74 continuously emits a signal which indicates that communication module 74 is station "0". If carrier 14 is empty, it has been programmed (in a manner to be explained) that its destination is station "0". Carrier module 37 then emits a signal to carrier communication module 74 through carrier transceiver 38, which indicates that carrier 14 is capable of accepting an item to be sorted. If an item is contained within the carrier 14, the carrier 14 is not programmed to have a destination of station "0", and is allowed to pass induction station 66 for subsequent processing in sortation system 10 as will be described. If the carrier 14 has been programmed such that its destination is station "0", transceiver 38 of the carrier 14 transmits its unique signal to carrier communication module 74, which identifies the particular carrier 14. A stop arm 76 is then actuated so as to maintain the carrier 14 at induction station 66. Stop arm 76 engages the front of carrier 14 to prevent movement of carrier 14, while roller chains 20 continue to move below carrier wings 22. While carrier 14 is maintained stationary, one or more items I are loaded into the carrier 14 in any satisfactory manner, such as by manual placement, induction conveyor or the like. The information pertaining to the identity of the item is then provided to controller 72 through input 68 and interface 70, and controller 72 then determines the desired destination sort station for the carrier 14 according to the order or sortation processing program. Controller 72 then communicates the destination sort station to carrier communication module 74, which transmits the destination sort station location to carrier transceiver 38. The memory or carrier module 37 then stores the destination sort station information, and stop arm 76 is retracted so as to allow subsequent movement of the carrier 14 on track arrangement 14.

Figure 9:
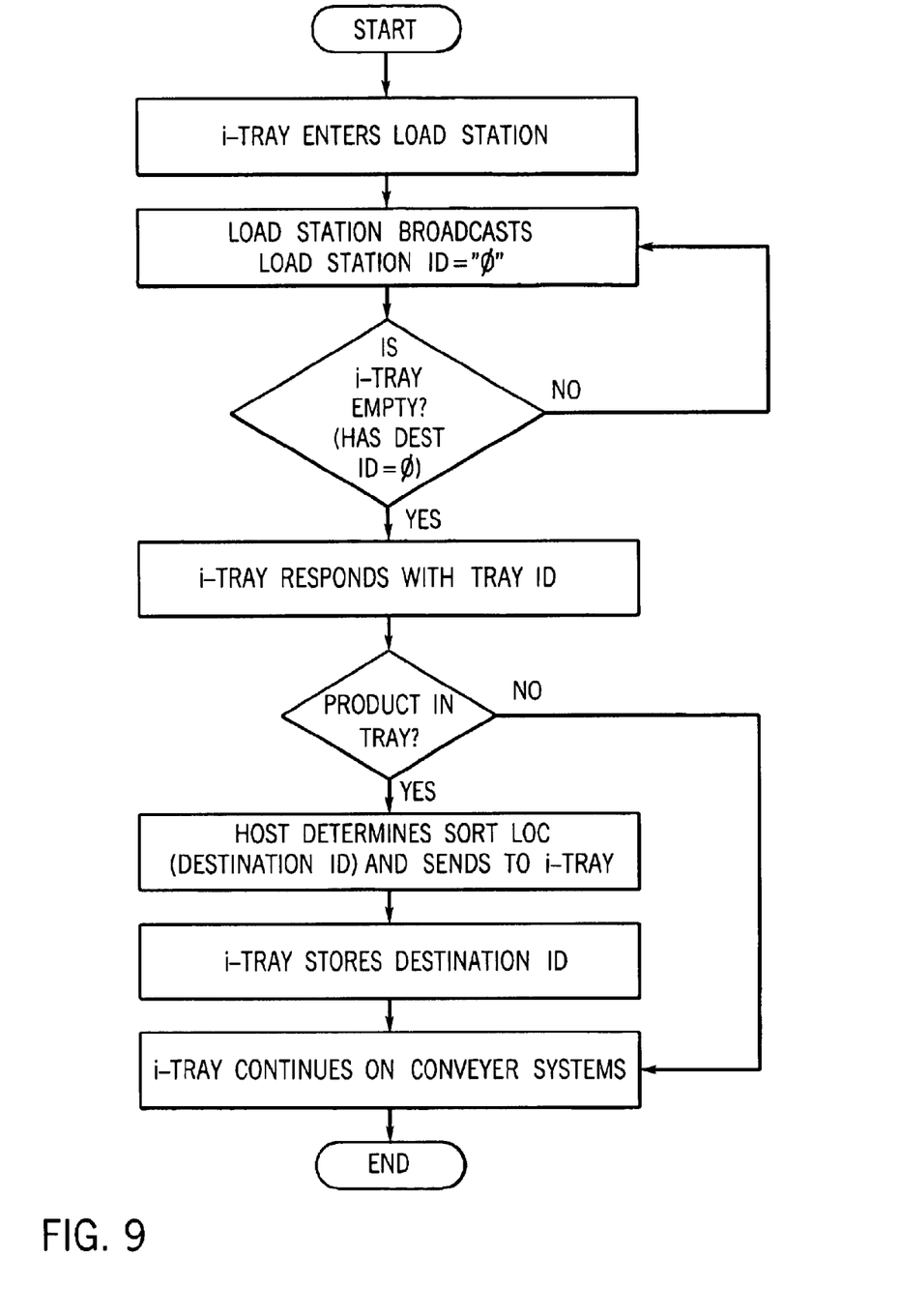

FIG. 9 illustrates an alternative sequence of operations, which does not involve stopping carriers 14 at induction station 66. In this version, each carrier 14 continuously moves through induction station 66, and information pertaining to the tray identity and destination sort station identity are broadcast from carrier communication module 74 on the fly, as the carrier 14 passes induction station 66.

Figure 10:
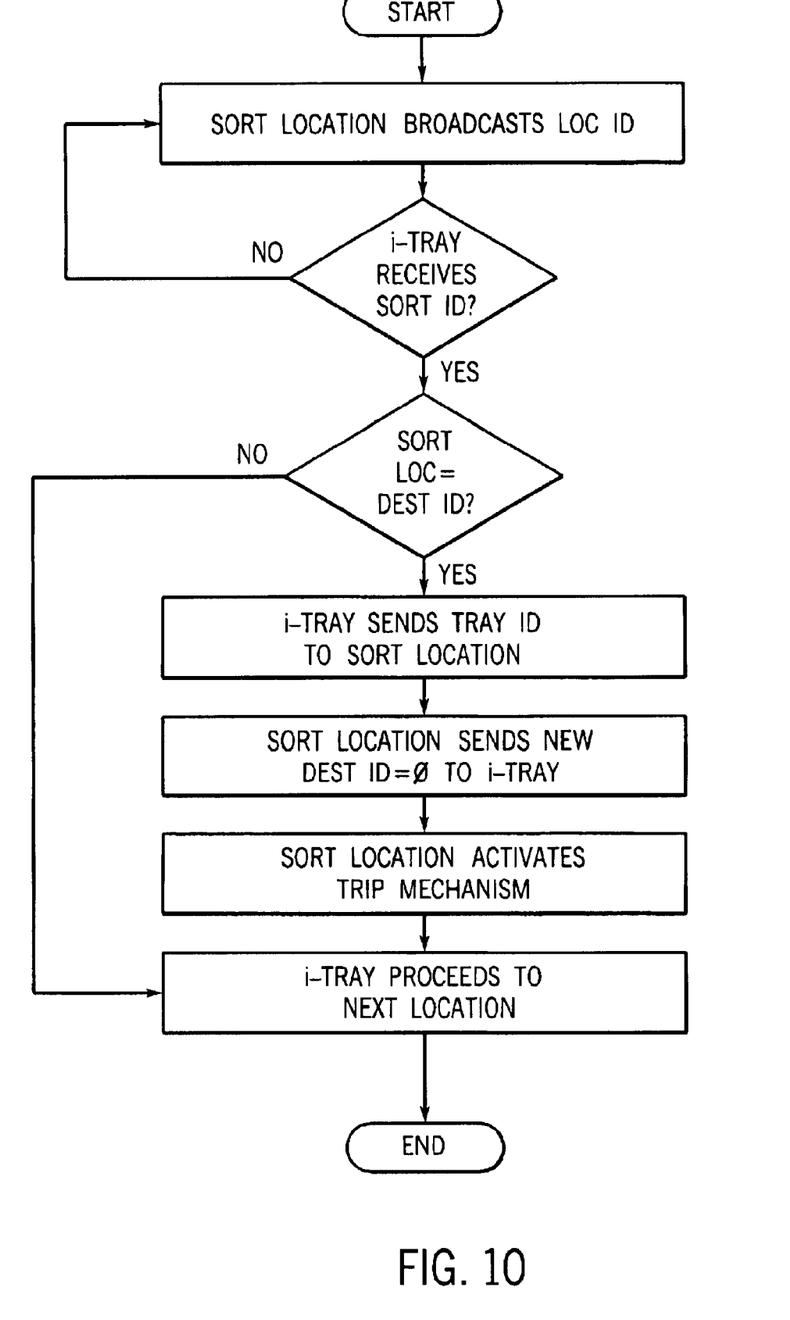

FIG. 10 illustrates the sequence of steps at each sort station S, as carriers 14 are moved on track arrangement 12 toward and past the sort stations S. Each sort station transceiver 50 continuously emits a unique signal which corresponds to the identity of the sort station S, and the carrier transceivers 38 continuously receive the emitted sort station signals. The program of each carrier 14 compares the sort station identification signal with the programmed destination sort station identification. If the sort station S is not the destination sort station, the carrier does not respond and instead passes to the next sort station S. If the sort station S is the destination sort station, the program of carrier 14 transmits its tray identification signal to the sort station module 42, which is received by transceiver 50. The program of sort station module 42 then transmits a new destination identification to the carrier 14, indicating that the next destination of carrier 14 is to be station "0", i.e. induction station 66, which is stored by carrier 14. The program of sort station module 42 then actuates motor 54 so as to move actuating arm 60 from its inoperative position of FIG. 4 to its operative position of FIG. 5, such that actuating arm 60 is received within the slot of actuator 32 to release the latch mechanism which maintains bottom panels 30 in the closed position. Bottom panels 30 then fall by gravity to the open position, to allow the item I to fall from carrier 14 and into chute 24, for supply to a box or other receptacle R at the discharge of chute 24. Carrier 14 then continues its movement on track arrangement 12, and bottom panels 30 are returned to their closed position by a passive reset mechanism, such as guide tracks which engage bottom panels 30 and pivot bottom panels 30 upwardly for return to the closed position, for reengagement with the latch mechanism in preparation for receiving another item to be sorted. The carrier 14 then continues to induction station 66 with its destination as station "0" as set forth above, to repeat the process.

While the invention has been shown and described with respect to a particular embodiment, it is understood that variations are possible without departing from the scope and spirit of the invention. For example, and without limitation, carriers 14 may be movable by means of a separate motor associated with each carrier 14, to eliminate the need for roller chain 20. In addition, the invention is not limited to use with the particular type of track system shown and described, and other arrangements for moving the carriers may be employed. For example, and without limitation, a conventional belt or chain conveyor may be employed for moving the carriers to the sort stations. Further, the various stations may have separate indicia carried by track arrangement 12 or any other stationary structure adjacent the sort station, which can be read by a reader associated with the carriers 14 to ascertain whether the carriers have arrived at the destination station. Further, while a false bottom type of discharge mechanism has been shown and described, it is understood that other types of discharge mechanisms may be employed, such as roller-top mechanisms, tilt-type mechanisms, kicker arrangements or the like. In addition, while infrared signals are described as being emitted and received by transceivers 38, 50, it is understood that any type of wireless communication between the sort stations and carriers may be employed, including RF communication.

The sortation system of the present invention thus provides a track-type system similar to those employed in the prior art, yet which provides dramatically increased throughput by utilizing all (or at least most) of the carriers at all times during operation. The system is capable of running at relatively low speeds while maintaining high throughput levels, which reduces wear and maintenance requirements for the system. The system is very easy to maintain, since the carriers are not physically connected to the drive mechanism and can easily be removed for servicing and replaced at any location. The system capacity can be easily changed by reducing or adding the number of carriers in operation at any given time, which provides flexibility in purchasing and upgrading. In addition, the sort stations can be moved to different locations in the system simply by moving sort station modules 42 and chutes 24 to various locations along the length of the conveying system. Similarly, sort stations can be added or removed by adding or subtracting sort station modules 42 and chutes 24, which provides significant flexibility in changing the operating parameters of the system.

Various alternatives and embodiments are contemplated as being within the scope of the following claims particularly pointing out and distinctly claiming the subject matter regarded as the invention.

I claim:

1. A sortation system, comprising:
   a track arrangement having a series of sort stations, wherein each sort station includes a sort station identifier, and wherein the track arrangement includes a movable drive arrangement;
   a series of carriers that are movable on the track arrangement via engagement with the movable drive arrangement, wherein the carriers are adapted to carry items destined to be deposited at the sort stations, and wherein each carrier includes a selectively actuable item discharge arrangement and a programmable carrier destination member that stores information corresponding to a destination sort station according to the one or items carried by the carrier; and
   an actuator configured to selectively operate the selectively actuable item discharge arrangement of each carrier;
   wherein the sort station identifiers interact with the carrier destination members to selectively operate the actuators and actuate the item discharge arrangements of the carriers to discharge the one or more items carried by each carrier at the destination sort station for the carrier.

2. The sortation system of claim 1, wherein the series of carriers are movable on the track arrangement independently of each other.

3. The sortation system of claim 2, wherein each actuator is associated with one of the sort stations, and wherein the programmable carrier destination member of each carrier comprises a signal emitter associated with each carrier, wherein each signal emitter is operable to emit an actuation signal to the actuator associated with a selected one of the sort stations.

4. The sortation system of claim 3, further comprising an induction station wherein items are placed into the carriers, and wherein each carrier is assigned a destination sort station in response to the item placed into the carrier at the induction station.

5. The sortation system of claim 4, wherein each carrier includes a wireless receiver interconnected with the programmable carrier destination member, and further comprising an input controller having a transmitter which transmits a signal corresponding to the destination sort station to the wireless receiver of the carrier in response to the identity of the item placed into the carrier at the induction station.

6. The sortation system of claim 3, wherein the actuator associated with each sort station comprises a signal receiver, wherein the signal receiver of a selected one of the sort stations receives the actuation signal from the signal emitter of one of the carriers and is operable to respond to the actuation signal to operate the actuator so as to actuate the item discharge arrangement of the carrier.

7. The sortation system of claim 6, wherein the actuator associated with each sort station further comprises a trip mechanism interconnected with the signal receiver, wherein the trip mechanism is movable from an inoperative position to an operative position in response to the actuation signal of one of the carriers.

8. The sortation system of claim 7, wherein the item discharge arrangement of each carrier comprises a bottom wall of the carrier which is movable between a closed position in which the bottom wall supports the item within an item-receiving volume defined by the carrier, and an open position when the trip mechanism is moved to its operative position and the carrier reaches the destination sort station, wherein the bottom wall in its open position releases support of the item to cause the item to fall by gravity out of the item-receiving volume defined by the carrier.

9. A sortation system, comprising:
   a track arrangement having a series of sort stations, wherein each sort station includes a sort station identifier;
   a series of carriers movable on the track arrangement independently of each other, wherein the carriers are adapted to carry items destined to be deposited at the sort stations, and wherein each carrier includes a selectively actuable item discharge arrangement and a signal emitter associated with each carrier that stores information corresponding to a destination sort station according to the one or items carried by the carrier; and
   an actuator for selectively operating the selectively actuable item discharge arrangement of each carrier, wherein each signal emitter is operable to emit an actuation signal to the actuator associated with a selected one of the sort stations;
   wherein the sort station identifiers interact with the signal emitters to selectively operate the actuators and actuate the item discharge arrangements of the carriers to discharge the one or more items carried by each carrier at the destination sort station for the carrier;

wherein the actuator associated with each sort station comprises a signal receiver, wherein the signal receiver of a selected one of the sort stations receives the actuation signal from the signal emitter of one of the carriers and is operable to respond to the actuation signal to operate the actuator so as to actuate the item discharge arrangement of the carrier.

10. The sortation system of claim 9, wherein the actuator associated with each sort station further comprises a trip mechanism interconnected with the signal receiver, wherein the trip mechanism is movable from an inoperative position to an operative position in response to the actuation signal of one of the carriers.

11. The sortation system of claim 10, wherein the item discharge arrangement of each carrier comprises a bottom wall of the carrier which is movable between a closed position in which the bottom wall supports the item within an item-receiving volume defined by the carrier, and an open position when the trip mechanism is moved to its operative position and the carrier reaches the destination sort station, wherein the bottom wall in its open position releases support of the item to cause the item to fall by gravity out of the item-receiving volume defined by the carrier.

12. A method of sorting items, comprising the steps of:
providing a plurality of carriers movable on a predetermined path, wherein the predetermined path comprises a track having a movable drive arrangement, wherein the track includes a series of sort stations;
placing one or more items in each carrier;
assigning each carrier a destination sort station according to the one or more items placed within the carrier, wherein information identifying the destination sort station is stored on the carrier;
providing a unique identifier for each sort station;
asynchronously moving the carriers on the predetermined path by operation of the drive arrangement such that the drive arrangement moves the carriers on the predetermined path independent of each other;
comparing the unique identifiers of the sort stations with the information identifying the destination sort station stored on each carrier to ascertain whether the carrier is in the vicinity of its destination sort station; and
discharging the one or more items from each carrier at the destination sort station when the carrier identifies the unique identifier for the destination sort station.

13. The method of claim 12, wherein the step of assigning each carrier a destination sort station is carried out by wirelessly transmitting a signal to a receiver associated with the carrier, wherein the signal is indicative of the destination sort station.

14. A method of sorting items, comprising the steps of:
providing a plurality of carriers movable on a predetermined path, wherein the predetermined path comprises a track having a movable drive arrangement, wherein the track includes a series of sort stations;
placing one or more items in each carrier;
assigning each carrier a destination sort station according to the identity of the item placed within the carrier;
providing a unique identifier for each sort station;
moving the carriers on the predetermined path by operation of the drive arrangement;
utilizing the unique identifiers of the sort stations to ascertain whether each carrier is in the vicinity of its destination sort station; and
discharging the one or more items from each carrier at the destination sort station when the carrier identifies the unique identifier for the destination sort station;
wherein the step of providing a unique identifier for each sort station comprises emitting a sort station identification signal in the vicinity of each sort station, wherein the carrier includes a receiver for receiving the sort station identification signal.

15. The method of claim 14, wherein the carrier includes an emitter, and wherein the step of discharging the one or more items from the carrier is carried out in response to an actuation signal emitted by the carrier in response to the carrier receiving the sort station identification signal of its destination sort station.

16. A method of sorting items, comprising the steps of:
providing a plurality of carriers movable on a predetermined path, wherein the predetermined path has a series of sort stations;
placing one or more items in each carrier;
assigning each carrier a destination sort station according to the identity of the item placed within the carrier;
providing a unique identifier for each sort station;
moving the carriers on the predetermined path;
utilizing the unique identifiers of the sort stations to ascertain whether each carrier is in the vicinity of its destination sort station; and
discharging the one or more items from each carrier at the destination sort station when the carrier identifies the unique identifier for the destination sort station;
wherein the step of providing a unique identifier for each sort station comprises emitting a sort station identification signal in the vicinity of each sort station, wherein the carrier includes a receiver for receiving the sort station identification signal,
wherein the carrier includes an emitter, and wherein the step of discharging the one or more items from the carrier is carried out in response to an actuation signal emitted by the carrier in response to the carrier receiving the sort station identification signal of its destination sort station;
wherein each carrier includes a selectively actuable discharge mechanism, and wherein each sort station includes an actuating mechanism movable from an inoperative position to an operative position in response to the actuation signal emitted by one of the carriers.

17. A method of sorting items, comprising the steps of:
providing a plurality of carriers movable on a predetermined path, wherein the predetermined path comprises a track having a movable drive arrangement, wherein the track includes a series of sort stations;
placing one or more items in each carrier;
assigning each carrier a destination sort station according to the identity of the item placed within the carrier;
providing a unique identifier for each sort station;
moving the carriers on the predetermined path by operation of the drive arrangement;
utilizing the unique identifiers of the sort stations to ascertain whether each carrier is in the vicinity of its destination sort station; and
discharging the one or more items from each carrier at the destination sort station when the carrier identifies the unique identifier for the destination sort station;
wherein the step of utilizing the unique identifiers of the sort stations is carried out on the carrier by software associated with the carrier which analyzes the unique identifiers of the sort stations to determine whether each sort station is the destination sort station assigned to the carrier.

18. In a sortation system including a track arrangement having a series of sort stations, the improvement comprising: a movable drive arrangement associated with the track arrangement; a series of carriers movable on the track arrangement by operation of the movable drive arrangement, wherein each carrier is adapted to receive and transport one or more items on the track arrangement, wherein each carrier includes a selectively actuable item discharge arrangement and a programmable carrier destination member, wherein the carrier destination member is operably configured to store information identifying a destination sort station for the carrier; means for supplying destination sort station information to the carrier destination member according to the one or more items carried by the carrier; an actuator for selectively operating the selectively actuable item discharge arrangement of each carrier; and a unique identification arrangement associated with each sort station; wherein the carrier destination member interacts with the unique identification arrangement of each sort station for matching the destination sort station of the carrier with the unique identification arrangement of a selected one of the sort stations to selectively operate the actuators and actuate the item discharge arrangements of the carriers for discharging the one or more items carried by each carrier at the destination sort station for the carrier.

19. The improvement of claim 18, wherein the carrier destination member on each carrier comprises a variable programmable member for storing information identifying the destination sort station according to the one or more items carried by the carrier.

20. The improvement of claim 19, wherein the means for supplying destination sort station information to the carrier destination member comprises a controller that receives an input indicating the identity of the one or more items carried by the carrier, and wherein the controller interacts with the variable programmable members of the carriers to store information on each carrier identifying the destination sort station for each carrier.

21. The improvement of claim 20, wherein the controller is operable to wirelessly transmit a signal to the programmable member of each carrier corresponding to the destination sort station for the carrier.

22. In a sortation system including a track arrangement and a series of carriers movable on the track arrangement, wherein the track arrangement includes a series of sort stations adapted to receive one or more items from the carriers, the improvement comprising:

an actuator located at each of the sort stations, wherein each actuator is movable between an operative position and an inoperative position;

a carrier destination arrangement associated with each carrier for indicating a destination sort station for the carrier to discharge one or more items carried by the carrier, and a signal emitter at each sort station which emits a signal unique to the sort station, wherein the carrier destination arrangement interacts with the unique signal of each sort station for matching the destination sort station of the carrier with the unique signal of a selected one of the sort stations, and wherein the carrier destination arrangement is interconnected with the movable actuator of the destination sort station for moving the actuator to the operative position to discharge the one or more items carried by the carrier at the destination sort station;

wherein each carrier includes a receiver that receives the signals from the signal emitters at the sort stations, and interacts with the actuator for moving the actuator between the operative and inoperative positions.

23. The improvement of claim 22, wherein each actuator receives an actuating signal from the carrier as the carrier approaches the destination sort station, for moving the actuator to the operative position to discharge the one or more items from the carrier at the destination sort station.

* * * * *